July 31, 1928.  
R. S. RODGERS  
1,679,269

SECTIONAL ABRASIVE REAMER

Filed Jan. 27, 1926

Ralph Stanley Rodgers  
INVENTOR

BY *Victor J. Evans*  
ATTORNEY

WITNESS: *John Donovan*

Patented July 31, 1928.

1,679,269

UNITED STATES PATENT OFFICE.

RALPH S. RODGERS, OF PITTSBURGH, PENNSYLVANIA, ASSIGNOR OF ONE-FOURTH TO JAMES E. HARMON AND ONE-FOURTH TO IKE J. NELSON, BOTH OF PITTSBURGH, PENNSYLVANIA.

SECTIONAL ABRASIVE REAMER.

Application filed January 27, 1926. Serial No. 84,229.

My present invention has reference to an efficient means for reaming the bores of cylinders, bushings or the walls of other round openings.

An important object of my invention is the provision of an abrasive reamer for this purpose whose reaming head is made up of adjustably associated segments whereby the bore of cylinders of varying diameters may be reamed, or whereby defective walls of a cylinder bore may be trued.

A still further object is the provision of an abrasive reamer which may be either hand or machine driven and which includes a cone carrying shank, the cone portion of which is engaged by the beveled inner faces of the segmental head of the reamer, the sections of the said head being spring influenced toward the cone, and being likewise spring influenced on the shank. Simple means is provided for adjusting the last mentioned spring means for moving the cone and shank longitudinally with respect to the head for expanding or contracting the head segments, thereby accurately adjusting the head with respect to the work on which it is to operate.

To the attainment of the aforegoing objects and others which will present themselves as the nature of the invention is better understood, the improvement further resides in certain novel features of construction, combination and operative association of parts, a satisfactory embodiment of which is illustrated by the accompanying drawings.

Figure 1:
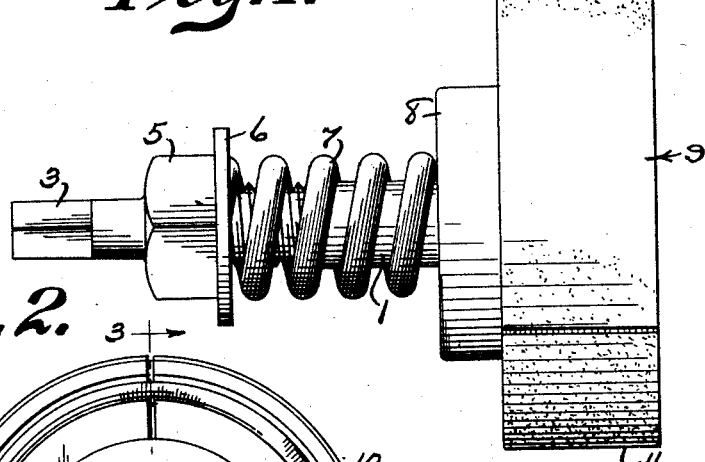
Figure 1 is a side elevation of my improvement.
Figure 2:
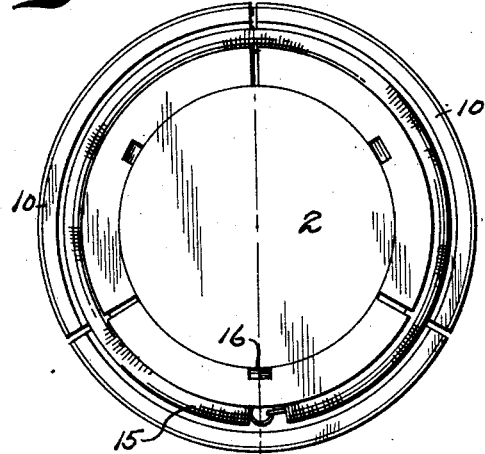
Figure 2 is a face view thereof.
Figure 3:
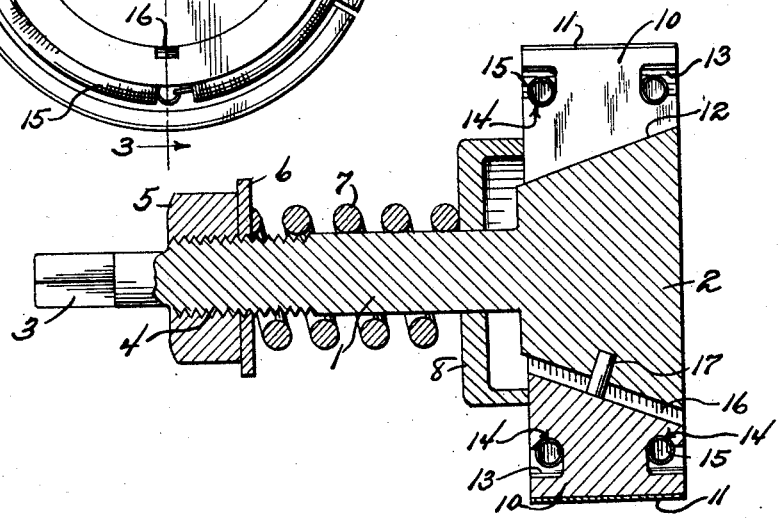
Figure 3 is a section view on the line 3—3 of Figure 2.

In carrying out my invention, I make use of a shank 1, having on one end and enlarged frusto-conical enlargement 2. The opposite end of the shank 1 is reduced and squared in cross section, as at 3, to provide a wrench hold, or to permit of the shank being arranged in the chuck of a suitable machine.

The shank 1, inward of its end 3, is threaded for a suitable distance, as at 4, and screwed on these threads there is a nut 5 which engages a washer 6 that is contacted by one end of a helical spring 7 that surrounds the stem 1. The opposite end of the spring 7 contacts with a hollow member or collar 8, and the flange of the said collar is in contacting engagement with the segments that constitute the head of the reamer.

The reamer head is broadly indicated by the numeral 9 and is made up of any desired number of segments 10. Each segment has an outer abrasive face 11. If desired, sand or other abrasive paper may be pasted on the outer faces of the segments 10. Each segment has its inner face or bore flared as at 12 for contacting engagement with the cone 2 of the shank 1. The opposite faces of the segments 10, adjacent to the outer periphery thereof are provided with oppositely disposed annular depressions 13 that communicate with round sockets 14 formed on the inner walls of the said depressions 13. In the sockets 14, there are endless spring coils 15, and these springs hold the segments 10 against the cone 2.

Each segment 10 has its inner wall 12, preferably at the center thereof formed with a continuous notch 16, and the cone 2 has projecting pins 17 that enter the respective notches 16. By this arrangement, the head segments are locked on the cone 2, so that both the cone and head will turn inwardly, while the pins hold the segments in proper relative position when the nut 5 is adjusted on the stem 1 and the segments comprising the head 9 are either expanded or contracted.

The simplicity of my construction and the advantages thereof will, it is thought, be perfectly apparent to those skilled in the art to which this invention relates, when the foregoing description has been carefully read in connection with the accompanying drawings, but I desire it understood that I have herein set forth only one satisfactory embodiment of my improved device and that I am not to be restricted thereto but may make all such changes therefrom as fairly fall within the scope of my claim.

Having thus described the invention, what is claimed as new, is:—

A reamer, comprising a cone carrying shank, a reamer head comprising a circular member having an abrasive face and made up of segments, the inner faces of said segments being complemental to and resting against the cone, said segments having continuous sockets in their end faces spaced from the outer abrasive faces thereof, endless coiled springs received in said sockets, means holding the segments from circumferential movement on the cone, but permitting longitudinal movement thereof, a flanged collar on the shank contacting with the segments, a nut screwed on the shank, a helical spring on the shank, contacting with the collar and a washer engaged by the nut and contacted by the spring.

In testimony whereof I affix my signature.

RALPH S. RODGERS.